(12) United States Patent
Heinlein

(10) Patent No.: US 6,817,452 B2
(45) Date of Patent: Nov. 16, 2004

(54) LEVER ASSEMBLY HAVING A SELECTABLE PUSH ROD RECEIVING INSERT FOR A VEHICLE BRAKE ASSEMBLY AND METHOD OF ASSEMBLY THEREFOR

(75) Inventor: Carl Edward Heinlein, Newport (GB)

(73) Assignee: ArvinMeritor Technology, LLC, Troy, MI (US)

(*) Notice: Subject to any disclaimer, the term of this patent is extended or adjusted under 35 U.S.C. 154(b) by 0 days.

(21) Appl. No.: 10/405,833

(22) Filed: Apr. 2, 2003

(65) Prior Publication Data
US 2004/0195051 A1 Oct. 7, 2004

(51) Int. Cl.⁷ .......................... F16D 55/08; F16D 55/16
(52) U.S. Cl. ................ 188/72.9; 188/73.31; 188/73.34
(58) Field of Search .............................. 188/72.7, 72.8, 188/72.9, 72.6, 71.9, 196 D, 71.8, 71.1, 106 F, 73.31, 73.45, 370, 73.34

(56) References Cited

U.S. PATENT DOCUMENTS

| 5,833,035 | A | * | 11/1998 | Severinsson | 188/72.7 |
| 5,927,445 | A | | 7/1999 | Bieker et al. | |
| 6,435,319 | B1 | * | 8/2002 | Thomas et al. | 188/72.1 |
| 6,481,542 | B2 | | 11/2002 | Giering et al. | |

* cited by examiner

Primary Examiner—Robert A. Siconolfi
Assistant Examiner—Devon Kramer
(74) Attorney, Agent, or Firm—Carlson, Gaskey & Olds

(57) ABSTRACT

A vehicle brake assembly includes a multi-component lever assembly. The lever assembly includes a push rod receiving insert received into a push rod receiving insert opening. The multi-component lever assembly provides for alternate final configurations during the final assembly stages of the brake assembly. The operating shaft is assembled into the brake housing through a housing opening which is closed off by a closing plate. The push rod receiving insert received is then passed through a push rod opening and into the push rod receiving insert opening until locked in place.

5 Claims, 5 Drawing Sheets

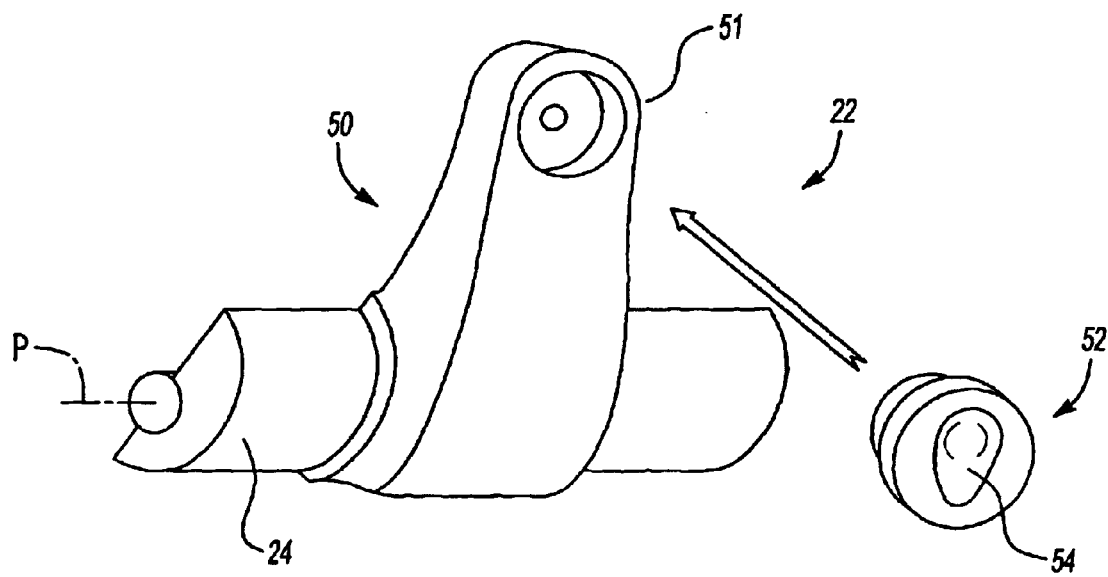
Fig-3
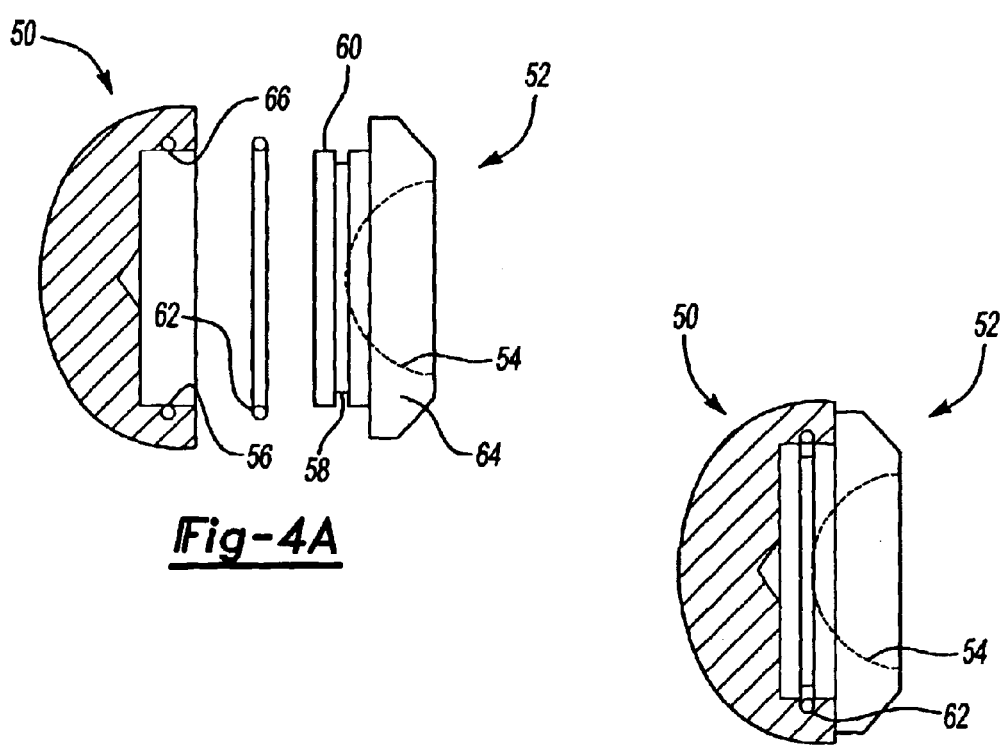
Fig-4A
Fig-4B

LEVER ASSEMBLY HAVING A SELECTABLE PUSH ROD RECEIVING INSERT FOR A VEHICLE BRAKE ASSEMBLY AND METHOD OF ASSEMBLY THEREFOR

BACKGROUND OF THE INVENTION

The present invention relates to a vehicle brake assembly and, more particularly, to a lever assembly for actuating the brake and a method of assembly therefor.

Disc brake assemblies typically include a disc brake caliper that houses a piston for forcing a pair of friction elements or brake pads into engagement with a rotor. Heavy-duty vehicle brake assemblies commonly include multiple pistons that are actuated by a cam manipulated by a pneumatic actuator. The heavy-duty brake assemblies may be relatively complicated compared to passenger vehicle brake assemblies and may be specifically tailored to particular heavy vehicle applications.

Various assembly line sequence limitations may require later assembly of certain brake mechanism components within the housing. One assembly line sequence limitation may be the desire to manufacture each brake assembly in an identical manner and assemble unique components for specific vehicle applications at final assembly stages to minimize tracking each brake assembly through the entire assembly process.

One particular tracking issue arises as specific vehicle applications may provide an actuator push rod of a specific length that must be accommodated by the brake assembly. Various brake components specific to the push rod length are assembled into the brake assembly for the specific push rod. The brake assembly is then dedicated to a particular vehicle application due to the assembly of the components that correlate to a specific push rod length. Each brake assembly must then be tracked along the assembly line once the specific components are assembled to assure the appropriate brake assembly is assembled into the appropriate vehicle application.

Disadvantageously, a relatively large number of individual brake components may already be assembled by the time the brake assembly reaches the final assembly stages. Assembly limitations stemming from the previously assembled components may then have to be addressed by utilizing different and perhaps small or less convenient housing openings to assemble the remaining components.

Accordingly, it is desirable to provide a vehicle brake assembly which allows unique component installation during the final assembly stages while maintaining component reliability.

SUMMARY OF THE INVENTION

The vehicle brake assembly according to the present invention provides a lever assembly that includes an operating shaft and a push rod receiving insert mounted thereto. The multi-component lever assembly provides for assembly during the final assembly stages of the brake assembly.

A push rod receiving insert is received into a push rod receiving insert opening in an operating shaft. An insert groove is formed in a shank of the push rod receiving insert to receive a snap ring. The shank fits into the push rod receiving insert opening until the snap ring engages an operating shaft groove to lock the push rod receiving insert into the operating shaft.

The operating shaft is assembled into the brake housing with the brake mechanism and the housing is assembled. The opening through which the operating shaft is assembled is closed by a closing plate. The push rod receiving insert is passed through a push rod opening and into the push rod receiving insert opening until locked in place.

A alternative push rod receiving insert includes a shank and snap ring which are passed entirely through the push rod receiving insert opening until the snap ring exits the opposite end of the push rod receiving insert opening. The snap ring opens and the push rod receiving insert is secured in the operating shaft between the snap ring and a head of the push rod receiving insert.

Another push rod receiving insert includes an interference retaining ring which fits between a shank of the push rod receiving insert and the push rod receiving insert opening inner diameter. The push rod receiving insert is secured in the operating shaft through an interference press fit.

The present invention thereby provides a vehicle brake assembly which allows unique component installation during the final assembly stages while maintaining component reliability.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is an exploded perspective view of a lever assembly;

FIG. 4A is an exploded view of the push rod receiving insert of the lever assembly illustrated in FIG. 3;

FIG. 4B is an expanded view of the assembled push rod receiving insert illustrated in FIG. 4A;

DETAILED DESCRIPTION OF THE PREFERRED EMBODIMENT

Figure 1:
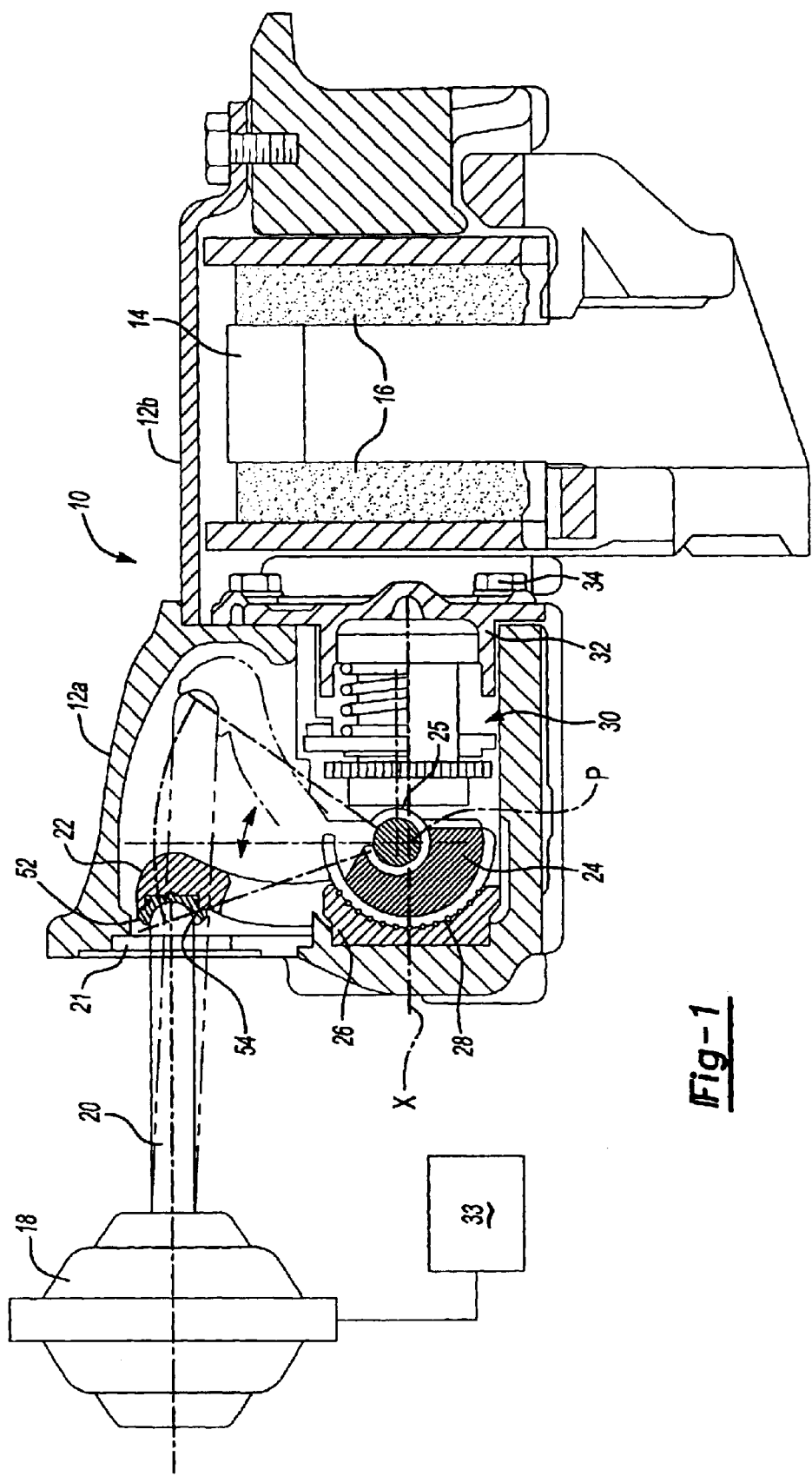
FIG. 1 is a cross-sectional end view of a vehicle brake assembly of the present invention.

FIG. 1 illustrates a general sectional view of a vehicle brake assembly 10. The vehicle brake assembly 10 includes a housing 12 that may be constructed from one or more housing portions 12a, 12b. A rotor 14 is arranged near or within the housing portion 12b to contain brake pads 16, or friction elements, arranged on either side of the outer surfaces of the rotor 14.

An actuator 18, typically an air chamber, actuates a brake mechanism 30 to force the brake pads 16 into engagement with the rotor 14. The actuator 18 drives a push rod 20 through a push rod opening 21 to rotate a lever assembly 22 about an axis of rotation. The lever assembly 22 includes a cam 24 having a profile 25 that cooperates with the brake mechanism 30 to drive the brake pads 16. The can 24 is preferably received at least partially supported by a bearing block 26 supporting a plurality of needle bearings 28 within the housing portion 12a. It should be understood that various actuating systems which are operated by a lever will benefit from the present invention.

The opening 31 of the housing which receives the brake actuation mechanism 30 is closed off on the front side, that is, in the position facing the brake disk, by a closing plate 32 which may at least partially support the brake actuation mechanism 30. The closing plate 32 is attached to the housing portion 12a by fasteners 34 or the like. Sealing elements are preferably located upon the sealing surfaces between the closing plate 32 and the housing 12.

In operation, upon actuation of the brake pedal by the vehicle operator, a signal is produced by a control module 33 to energize the actuator 18. Heavy-duty vehicle brake assemblies typically include a pair of pistons 36 (FIG. 2) that transmit the force generated by the actuator 18 through the push rod 20, lever assembly 22, and the brake actuation mechanism 30 to the brake pads 16. It is to be understood that any suitable number of pistons 36 may be used.

Figure 2:
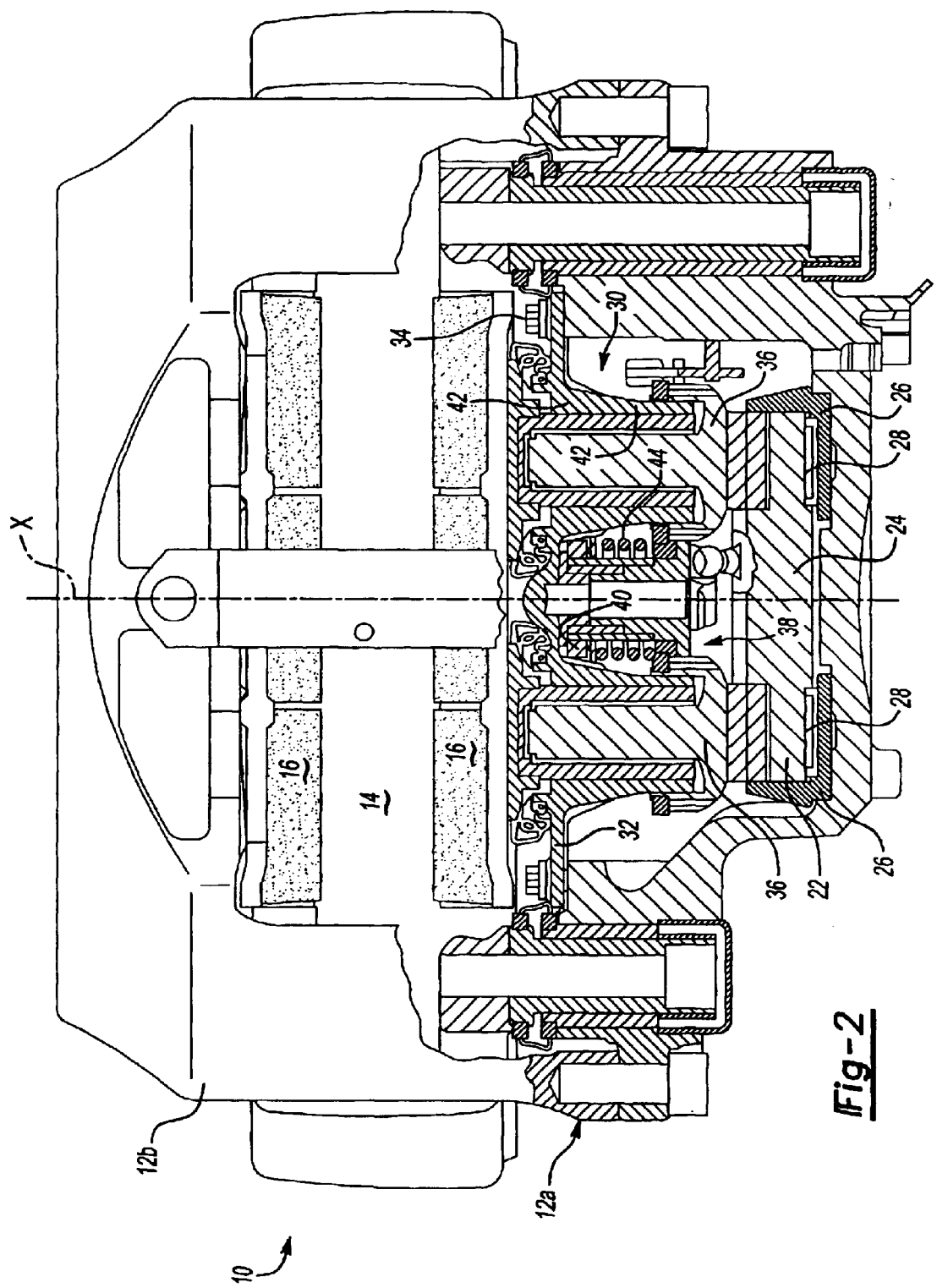
FIG. 2 is a cross-sectional top elevation view of the present invention.

Referring to FIG. 2, the brake pads 16 must be retracted after actuation to prevent the brake pads 16 from dragging on the rotor 14. To this end, a return assembly 38 operates to retract the pistons 36. The return assembly 38 includes a return plate 40 adjacent a plurality of teeth 42. A return spring 44 is arranged between a portion of the housing 12 and the return plate 40. The return spring 44 applies a force opposite the actuation force to the return plate 40 and into the pistons 36 to retract the brake pads 16.

Referring to FIG. 3, the lever assembly 22 includes an operating shaft 50 and a push rod receiving insert 52 mountable thereto. The operating shaft 50 includes the cam bearing surface 24 and defines the axis of rotation (FIG. 1). It should be understood that various operating shaft 50 profiles will benefit from the present invention.

The push rod receiving insert 52 is preferably manufactured of a sintered metal (powder metallurgy) minimizing or alleviating the requirement or hardening of a segment 51 of the operating shaft 50. It should be understood that although the push rod receiving insert 52 is disclosed as a substantially circular member in the illustrative embodiment, other shapes will also benefit from the present invention.

The push rod receiving insert 52 includes a cupped segment 54 for receipt of the push rod 20 (FIG. 1). The push rod receiving insert 52 of a specific design, such as to accommodate a push rod 20 of a desired length specific to a particular brake assembly 10 may be selectively assembled to the common operating shaft 50 according to the present invention. That is, cupped segment 54 of the push rod receiving insert 52 may be of a predefined depth to accommodate a predetermined push rod 20 length. Likewise, operating shafts of a design specific to a particular brake assembly 10 may be interchangeably assembled with the push rod receiving insert 52 according to the present invention.

Referring to FIG. 4A, push rod receiving insert 52 is received into a push rod receiving insert opening 56 in the operating shaft 50. An insert groove 58 is formed in a shank 60 of the push rod receiving insert 52 to receive a snap ring 62. The shank 60 fits into the push rod receiving insert opening 56 such that a head 64 of the push rod receiving insert 52 contacts the operating shaft 50 (FIG. 4B).

An operating shaft groove 66 is formed in the inner diameter of the push rod receiving insert opening 56. The snap ring 62 is preferably pre-assembled into the insert groove 58 prior to fitting the push rod receiving insert 52 into a push rod receiving insert opening 56. The shank 60 is then pushed into the push rod receiving insert opening 56 until the snap ring 62 engages the operating shaft groove 66 to lock the push rod receiving insert 52 into the operating shaft 50 (FIG. 4B).

As the push rod receiving insert 52 and the cupped segment 54 are preferably symmetric a rotational orientation feature need not be provided. That is, the cupped segment 54 will receive the push rod 20 irrespective of orientation, however, an orientation feature such as a slot and key can be alternatively or additionally readily incorporated.

Figure 4C:
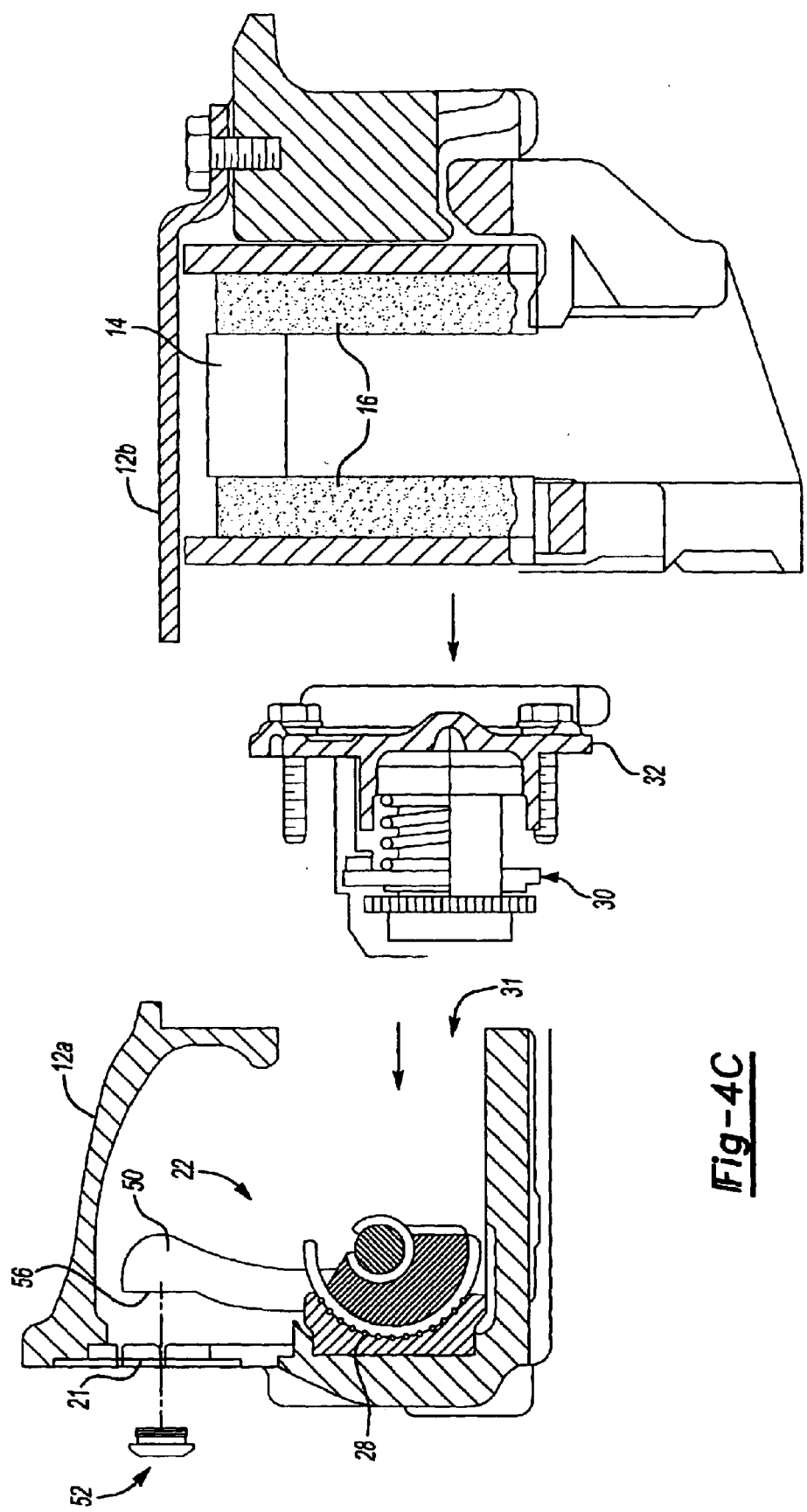
FIG. 4C is a perspective view of assembling the lever assembly into the brake housing.

Referring to FIG. 4C, an assembly sequence for the lever assembly 22 is illustrated. The operating shaft 50 is assembled into the housing portion 12b and located upon the needle bearing 28 to cooperate with the brake actuation mechanism 30. The brake actuation mechanism 30, closing plate 32, and housing portion 12b may then be assembled to housing portion 12a. As opening 31 is now closed by closing plate 32, the push rod receiving insert 52 is passed through the push rod opening 21 and into the push rod receiving insert opening 56 until locked in place.

It should be understood that various assembly line sequence requirements may require later assembly of the push rod receiving insert 52 to the operating shaft 50 such as to accommodate a push rod 20 of a particular length. That is, when it is determined which vehicle the brake assembly 10 will be used in, the push rod receiving insert 52 appropriate to the push rod of that vehicle is selected and assembled to the operating shaft 50. This is achieved through the push rod opening 21 even though the brake assembly 10 is substantially complete. The push rod opening 21 and single direction insertion and locking of the lever 52 according to the present invention provides the flexibility to accommodate such assembly line sequence requirements.

Figure 5A:
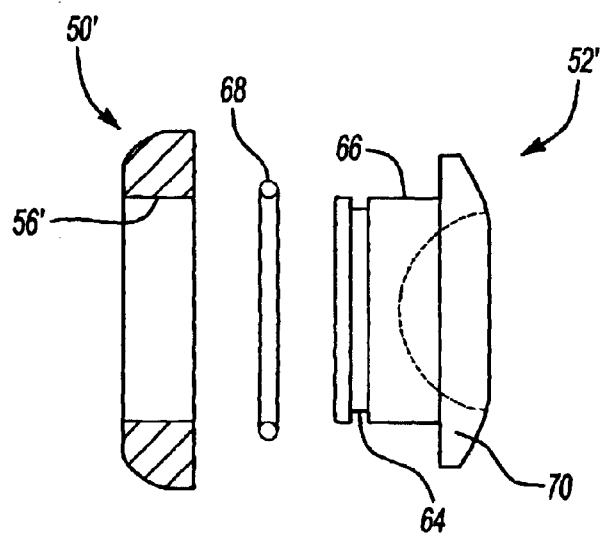
FIG. 5A is an exploded view of an alternate push rod receiving insert for the lever assembly illustrated in FIG. 3.
Figure 5B:
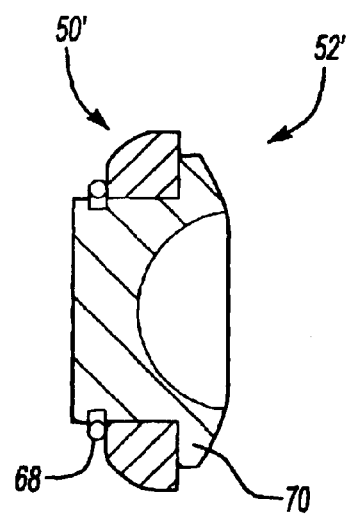
FIG. 5B is an expanded view of the assembled push rod receiving insert illustrated in FIG. 5A.

Referring to FIG. 5A, another push rod receiving insert 52' is received into the push rod receiving insert opening 56' in the operating shaft 50 (FIG. 5B). The push rod receiving insert opening 56' passes through the operating shaft 50. An insert groove 64 is formed in a shank 66 of the push rod receiving insert 52' to receive a snap ring 68. The shank 66 fits through the push rod receiving insert opening 56 and a head 70 of the push rod receiving insert 52' contacts the operating shaft 50 (FIG. 5B).

As the push rod receiving insert 52' is fitted into the push rod receiving insert opening 56', the snap ring 68 is radially compressed into the groove 64. The shank 66 and snap ring 68 are passed through the push rod receiving insert opening 56' until the snap ring 66 exits the opposite end of the push rod receiving insert opening 56'. The snap ring 68 being no longer constrained by the push rod receiving insert opening 56' "snaps" open and the push rod receiving insert 52' is secured in the operating shaft 50 between the snap ring 68 and the head 70 (FIG. 5B).

Figure 6A:
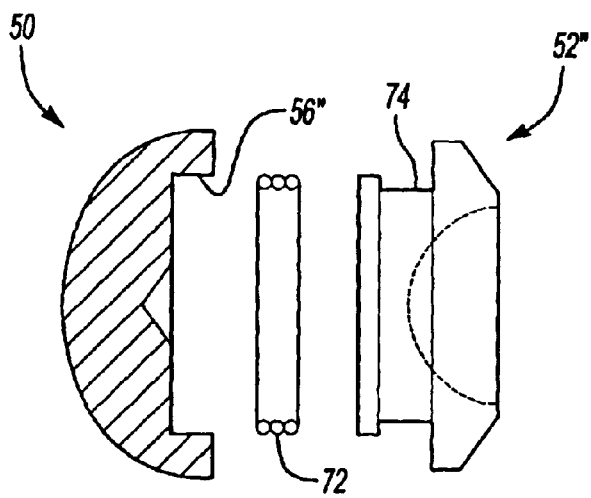
FIG. 6A is an exploded view of an alternate push rod receiving insert for the lever assembly illustrated in FIG. 3.
Figure 6B:
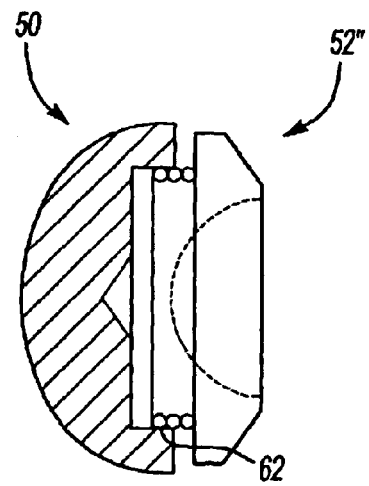
FIG. 6B is an expanded view of the assembled push rod receiving insert illustrated in FIG. 6A.

Referring to FIG. 6A, another push rod receiving insert 52" is received into the push rod receiving insert opening 56" in the operating shaft 50 (FIG. 6B). An interference retaining ring 72 fits between a shank 74 of the push rod receiving insert 52" and the push rod receiving insert opening 56". The push rod receiving insert 52" is thereby secured in the operating shaft 50 through an interference press fit. A relatively small amount of force may be utilized to install the push rod receiving insert 52" as the push rod receiving insert 52" will only receive unidirectional force from the push rod 20. Again, the push rod receiving insert is inserted through the push rod opening 21 in both the FIGS. 5A and 6A embodiments.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of assembling a lever assembly into a vehicle brake housing comprising the steps of:

(1) assembling an operating shaft comprising a push rod receiving insert opening into a brake housing through a first opening; and (2) passing a push rod receiving insert though a second opening in the brake housing and lockingly engaging the push rod receiving insert into the push rod receiving opening.

2. A method as recited in claim 1, wherein said step (2) further comprises passing the push rod receiving insert through a push rod opening in the brake housing.

3. A method as recited in claim 1, further comprising the steps of:

(a) assembling a snap ring to the push rod receiving insert; and (b) pushing the push rod receiving insert into the push rod receiving inert opening to radially compress the snap ring until the snap ring engages a groove within the inner diameter of the push rod receiving insert opening to lock the push rod receiving insert into the operating shaft.

4. A method as recited in claim 1, further comprising the steps of:

(a) assembling a snap ring to the push rod receiving insert; and (b) pushing the push rod receiving insert into the push rod receiving insert opening to radially compress the snap ring until the snap ring exits the push rod receiving insert opening to lock the push rod receiving insert into the operating shaft.

5. A method as recited in claim 1, further comprising the steps of:

(a) assembling an interference retaining ring to the push rod receiving insert; and pushing the rod receiving insert into the push rod receiving insert opening to provide an interference fit therebetween.

* * * * *

UNITED STATES PATENT AND TRADEMARK OFFICE
CERTIFICATE OF CORRECTION

PATENT NO. : 6,817,452 B2
DATED : November 16, 2004
INVENTOR(S) : Heinlein

It is certified that error appears in the above-identified patent and that said Letters Patent is hereby corrected as shown below:

Column 5,
Line 21, "though" should read as -- through --.

Column 6,
Line 6, "inert" should read as -- insert --.
Line 24, insert -- (b) -- before "pushing".
Line 24, insert -- push -- after "the" and before the first occurrence of "rod".

Signed and Sealed this

Thirty-first Day of May, 2005

JON W. DUDAS
*Director of the United States Patent and Trademark Office*